United States Patent [19]

Smith

[11] Patent Number: 4,814,201
[45] Date of Patent: Mar. 21, 1989

[54] APPARATUS AND METHOD FOR APPLYING A LAYER OF FIBER ON A SURFACE

[76] Inventor: William H. Smith, 163 Orchard Dr., McMurrary, Pa. 15317

[21] Appl. No.: 90,918

[22] Filed: Aug. 31, 1987

[51] Int. Cl.$^4$ ............................................. B05D 1/12
[52] U.S. Cl. ................................... 427/196; 427/426; 118/300; 239/424.5
[58] Field of Search ................ 427/426, 196; 239/422, 239/424.5, 424, 423; 118/300

[56] References Cited

U.S. PATENT DOCUMENTS

| | | | |
|---|---|---|---|
| 3,168,411 | 2/1965 | Walsh | 239/422 X |
| 3,788,555 | 1/1974 | Harrison et al. | 239/422 |
| 3,893,621 | 7/1975 | Johnson | 239/422 X |
| 4,317,851 | 3/1982 | Neser | 427/426 |
| 4,547,403 | 10/1985 | Smith | 239/424.5 |
| 4,664,969 | 5/1987 | Rossi et al. | 427/426 |
| 4,689,249 | 8/1987 | Thygesen | 427/426 |

*Primary Examiner*—Shrive Beck
*Attorney, Agent, or Firm*—William J. Ruano

[57] ABSTRACT

Method and apparatus for applying refractory fibers on a surface, comprising spraying two different binders which chemically combine on the fibers as they are being sprayed preferably spraying one binder interiorly and the other, exteriorly of the sprayed fibers. One binder is an acid and the other is a base that chemically combine, such as orthophosphate pentoxide and sodium silicate, respectively.

20 Claims, 1 Drawing Sheet

U.S. Patent   Mar. 21, 1989   4,814,201
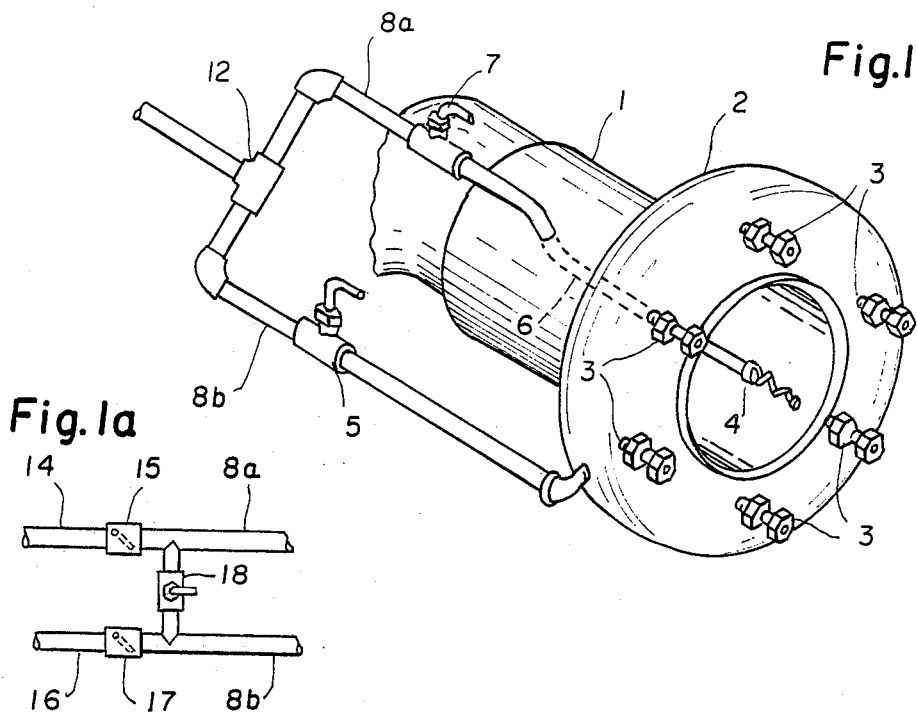
Fig.1
Fig.1a
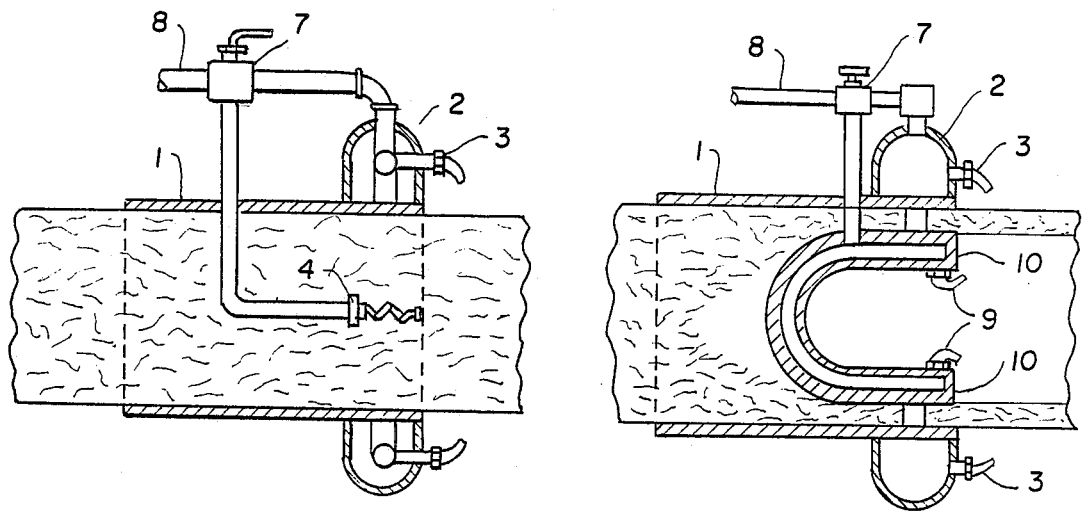
Fig. 2          Fig.3

APPARATUS AND METHOD FOR APPLYING A LAYER OF FIBER ON A SURFACE

BACKGROUND OF THE INVENTION

This invention relates to an apparatus and a method of applying insulating fibers on a surface by means of a spray gun, such as in my prior patent No. 4,547,403. Such apparatus and method has not met with complete success in uniformly spraying the flowing insulating fibers with a binder. A shortcoming of the method and apparatus is that it employs a single binder and requires heat to set the sprayed fibers.

SUMMARY OF THE INVENTION

An object of the present invention is to overcome the above-mentioned limitations in the present apparatus and methods.

A more specific object of the invention is to provide a novel spray gun and method which enables more uniform distribution of the binder throughout the stream of fibers as it exits the spray gun.

Another object of the invention is to apply two(or more) binders which react with each other chemically during the exit of the flow of insulating fibers through and from the spray gun.

Still another object of the invention is to provide a novel method and process of spraying heat-resistant refractory fibers on a substrate utilizing a multiple binder system as well as the use of a binder system that is reacted upon by a gas, such as carbon dioxide.

BRIEF DESCRIPTION OF THE DRAWINGS

FIG. 1 is a top perspective view of the spray gun embodying the present invention and FIG. 1a shows a modified inlet thereof;

FIG. 2 is a vertical cross-sectional view of a modification thereof; and

FIG. 3 is a vertical section of a modification of FIG. 2.

DETAILED DESCRIPTION OF THE PREFERRED EMBODIMENTS

Referring more particularly to FIGS. 1 and 2 of the drawing, numeral 1 denotes a cylindrical housing through which a stream of heat insulating fibers is blown in the direction shown by the arrow in FIG. 2. An annular manifold 2 encircles said housing at one end thereof and is provided with a plurality of nozzles 3 at spaced intervals along the circumference of the manifold. Said nozzles are adjustably inclined generally inwardly and may be disposed at different angles to more thoroughly cover a stream of fibers emanating from the housing. A valve 5 controls the flow to nozzles 3.

A central nozzle 4 is provided which is preferably in the shape of a spiral so as to provide a somewhat helical spiral path to the discharged binder so as to thoroughly mix the binder from the inside of the stream of fibers. The binder is fed into spiral nozzle 4 by means of a pipe 6 having a valve 7.

Instead, a plurality of circularly disposed nozzles 9 on manifold 10 may be used in place of nozzle 4, as shown in FIG. 3. Thus part of the binder stream will be fed to and discharged from the spiral nozzle 4 (FIG. 2) to meet the fiber steam with one chemical solution or nozzles 9 (FIG. 3) to mist the fiber stream with the one chemical solution and the other part of the binder will be discharged through the plurality of external nozzles 3 by a separate chemical solution which reacts with the first, whereby the binder will effectively penetrate the binder stream from within as well as from without the discharged fiber stream and effect uniform distribution of binder on the insulating fibers and expedite the reaction between the two different chemical solutions.

Additionally, the nozzle orifices could individually have their own pattern of spray, angle of spray relative to the stream of fibers and are adjustable with regard to the angle of attack to the fiber stream. Moreover, the orifice size as related to pressure could relate to the amount of chemical system being discharged through the end of the orifces A design could also be constructed wherein the outer periphery of jets could be so constructed that they would alternately discharge a separate chemical liquid.

The inner and outer design nozzle could also accomodate the use of a chemical system either through the internal or external orifices in combination with a gas such as carbon dioxide. The chemical systems which could apply to the multiple binder system approach to spray fiberization could be a phosphoric acid compound such as orthophosphate pentoxide which would react with a base or alkaline system to create polymerization. Basically the function of the acid system would be that of neutralizing to a pH of approximately 7.0 a sodium silicate chemical system or other silicite chemical systems.

The anticipated use of the acid side of the chemical system would be to dilute the acid concentrate after dilution to a pH value of 1.7. Experimentation has determined that diluted acid system ratio to sodium silicate, in order to obtain a less than ten second set, was that 1.15 gallons of acid solution would be needed to neutralize one gallon of the sodium silicate solution. The interreaction between the acid and the silica side of the system results in a hard silica gel with a pH value close to 7.0. Since it is known that one gallon of diluted acid chemical will neutralize 0.89 pounds of sodium silicate, set times can be established based on the amount of sodium contained in the base chemical.

Sodium silicate, potassium silicate, sodium-potassium siicate and colloidal silicate are some of the base reagents that can be used in conjunction with an acid base system. Others would include sulfuric acid, hydrochloric acid, ammonium sulfate and sodium aluminate.

It is anticipated that both the sodium silicates, potassium silicates would be diluted with a given amount of potable water by volume as well as the acid side of the system in order to effect economies of usage.

A western bentonite clay would be pre-mixed with the sodium silicate and other base compounds in order to achieve a higher refractory compound that would adhere to the various substrates (wood, metal, ceramic, etc.) effecting a good bondable layer between the substrate and the applied fiber.

Since the set time of a silica-acid mixture is dependent on the final pH value of the mixture, pH values can be predetermined by tritation. Since the gelation of a soluable silicate at a pH value of 7.0 is almost instantaneous, the acid and base sides of the binder system discharged through a separate system in a multiple nozzle can effect a sprayable fiberous mass with fast set times in the absence of heat.

Thus it will be seen that I have provided a more uniform and adequate misting of pneumatically conveyed insulative fibers through: (1) the mounting of discharge binder jets on the outer periphery of the discharge section in concert with the installation of an internal nozzle that would be mounted within the stream of fluidized fibers, hereby having the ability to mist the fibers within the pneumatically conveyed stream both from within and on the outer periphery upon discharge from said nozzle. Current designs either mist exteriorly from the outside thereby not contacting the inner cross-section of the fluidized stream of fibers) or mist from the inside (thereby not contacting the outer periphery of discharge fibers). This device would combine the advantages of both exterior and interior mixing and offering a more efficient nozzle system. Additionally, it would allow the reduction of line pressure now being needed to achieve proper atomization and dispersion of the binder system on the fiber materials since there would be greater discharge orifice area, consequently pressures could be reduced in order to achieve the volume necessary of binder relative to the pounds of fiber being discharged.

Additionally, the design lends itself towards using two distinct binder systems of a different chemical character, namely: a potassium silicate and/or a sodium silicate compound being discharged through one system and an acidic system being discharged through another nozzle system. The acidic system through contact with a highly alkaline system would thereby gel the alkaline system and make for a quick setting binder system for the misted fibers. Other chemical systems that would be considered reactant with one another could be used in the two stage system.

Additionally, another approach could be the use of a single chemical system which would be discharged through both the internal and external nozzles jets which would bring about a more effective misting of the fibers since they are being contacted both from within and from without the stream of pneumatically conveyed fibers.

Still another approach in the spray application of fibers could be the use of a gas which would be routed through one of the nozzle systems (either internal or external) and that gas, mainly $CO_2$ (carbon dioxide), would react with a sodium silicate binder system thereby creating a "quick cure" insulating layer on a substrate.

Different binder system line pressures could be used to maximize the effective atomization of the different binder systems based on their specific gravity.

If one binder system is used through both nozzles, a yoke 12 is installed on the main discharge line to the nozzle to allow the routing of the binder system to both the internal nozzle and the external nozzle ring.

If two separate binder systems are used of a different chemical character, two separate lines 8*a*, 8*b* are used to both the internal and the external misting system.

One of the advantages of having a quick setting system is that it would not require the application of heat in order to "set" the insulative material since it would be "set" chemically. This allows the application of insulative fibers on those areas of application that require good insulative characteristics; for example, residential, commerical, and industrial applications.

In short the present invention constitutes a significant improvement over that covered in applicant's prior U.S. Pat. No. 4,547,403 which required the layer of fibers to be "cured" such as by subjecting it to a temperature of at least 350° F. for a few hours in order to cure the binder and fiber. In contrast, the present invention eliminates the necessity of such prolonged heating of the fiberous layer and wherein, instead, the acid and alkali binders are instantaneously set while in transit to the substrate, which substrate need not be heated.

An improved modification of the present invention comprises initial application, such as by spraying of a refractory mastic on a refractory substrate such as brick, ramming mix, plastic, gunning mix, insulating brick, etc. The spraying of the mastic serves as a "interface binder mechanism" to securely bond the fibrous materials to hard burned and dry substrates. The procedure would be to clean the surface to be sprayed through scraping, sand blasting, etc. to remove all slags, oxides, carbon, etc. and then spray approximately ⅛" to ¼" of refractory mastic over the substrate prior to the spray application of the alumina silica fibers. The transport of the fibers that are pneumatically conveyed are then driven into the sticky, wet mass of refractory mastic thereby bonding them securely to the substrate. This procedure would eliminate the migration of binder system from the chemically bonded alumina silica fibers into the dry and hygroscopic substrate thereby creating a "laminate plane" wherein the fibrous material could be disengaged from the dry substrate. The refractory mastic would be applied in a heavy "paint-like" consistency via a peristalic pump and spray applied to facilitate speed of application. The refractory mastic would bond securely to all types of refractory substrates since it is extremely adherent and would make an excellent "tacky" background to receive the alumina silica fibers. This procedure would ensure the adhesion of the refractory fibers to various types of substrates since a "tacky" background would be much more receptive to the adherence of fibers as opposed to a dry refractory background. The refractory mastic could be comprised of tabular alumina, calcined alumina and refractory clays that would be bonded with a phosphoric acid binder system.

The sprayed or otherwise applied refractory mastic could contain about 1–10% by weight of refractory fibers that would serve as a receptive background upon which to spray chemically bonded fibers.

FIG. 1*a* shows a further modification of the inlet piping of FIG. 1 to selectively permit separate feeding of both inlet lines 8*a* and 8*b* by either or both binders Assuming acid is fed through inlet 14 and a base if fed through inlet 16, by closing valve 18 and opening valves 15, 16 which may be check valves, the acid is fed through valve 15 and pipe 8*a* and the base, through valve 17 and pipe 8*b*. If valve 18 is opened, then acid is fed through both 8*a* and 8*b*,—if valve 17 is closed. Likewise, base is fed through both 8*a* and 8*b* if valve 17 is closed. It is sometimes desirable to feed either the acid or base first followed by the other.

A preferable combination of binders, from the standpoint of effectiveness and low cost, is orthophosphate pentoxide as the acid and sodium silicate as the base.

Thus it will be seen that I have provided a novel apparatus and method for applying refractory fibers to a surface including spraying a plurality of binders of acid and base which are applied separately but which combined and become neutralized during the course of spraying of the fibers onto a surface.

While I have illustrated and described several embodiments of my invention, it will be understood that these are by way of illustration only and that various changes and modifications may be contemplated in my invention and within the scope of the following claims:

I claim:

1. A method of applying a layer of heat insulating fibers to a surface comprising the steps of:
   directing a stream of said fibers toward said surface:
   spray coating said directed fibers with two separate liquid binder sprays, one liquid binder spray on the outside directed angularly inwardly and one on the inside of said stream of fibers directed angularly outwardly, each spray having a different chemical composition than the other and such that said liquids react chemically with each other and causing the fibers to adhere to one another and to said surface.

2. The method recited in claim 1 wherein the resulting fibers are of high temperature refractory silicate and wherein said binders are inorganic and react chemically with each other during said step of directing.

3. The method recited in claim 2 wherein one of said binders is acidic and the other, a base, so that their uniting forms a gel to adhere the fibers to said surface and to each other.

4. The method recited in claim 3 wherein one of said inorganic binders is a silicate and the other, and acid.

5. the method recited in claim 4 together with carbon dioxide gas which reacts with said silicate to effect quick cure.

6. The method recited in claim 4 wherein said acid is orthophosphate pentoxide and said base is sodium silicate.

7. The method recited in claim 3 wherein one of said inorganic binders is sodium silicate and the other, an acid which reacts therewith to form a gel.

8. The method recited in claim 3 wherein one of said binders includes potassium silicate and the other, an acid which reacts therewith to form a gel.

9. The method recited in claim 3 wherein the pH value of the combined binders is about 7 pH.

10. The method recited in claim 3 wherein said acidic binder is phosphoric acid.

11. The method recited in claim 3 wherein said insulating fibers are alumina-silica refractory fibers and wherein said one of said binders is a collodial silicate.

12. The method recited in claim 11 wherein said mastic layer is initially sprayed onto said substrate.

13. The method recited in claim 3 including the initial steps of providing a mastic layer of fibers on a substrate before directing a stream of said fibers toward the surface of the substrate.

14. the method recited in claim 3 wherein said base binder is of the group of sodium and potassium silicate and is sprayed separately from said acid.

15. The method recited in claim 3 wherein said acid is a phosphoric acid compound.

16. The method recited in claim 3 wherein said acid is orthophosphate pentoxide.

17. In an apparatus having means for forming and discharging a stream of air containing fibers including a spray gun having a conduit, a plurality of nozzle means for spraying a liquid into said stream from the outside of said conduit; the improvement comprising a plurality of nozzle means for spraying a second liquid angularly outwardly from the inside of said stream which is different in chemical composition from said first mentioned liquid and of a different chemical composition to chemically combine therewith to form a gel to enable said stream of fibers to adhere to a surface and to each other.

18. Apparatus as recited in claim 17 wherein said liquids are inorganic and one of said liquids is an acid and the other, a base.

19. Apparatus as recited in claim 17 wherein one of said liquids is sodium silicate and the other is an acid combinable therewith to quickly form a gel.

20. Apparatus as recited in claim 17 together with means for also introducing carbon dioxide in said stream to effect quick cure.

* * * * *